United States Patent [19]
Harrison

[11] 3,732,001
[45] May 8, 1973

[54] AUTOMATIC LENS FOCUSING METHOD AND APPARATUS

[76] Inventor: William J. Harrison, 116 Longfellow Road, Mill Valley, Calif. 94941

[22] Filed: Feb. 22, 1971

[21] Appl. No.: 117,815

Related U.S. Application Data

[63] Continuation of Ser. No. 691,405, Dec. 18, 1967, abandoned.

[52] U.S. Cl. ................................................353/101
[51] Int. Cl. ..............................................G03b 3/10
[58] Field of Search ..................353/69, 101; 95/44; 352/140; 250/204, 205, 206; 356/4, 125, 126

[56] References Cited

UNITED STATES PATENTS 2,524,807  10/1950  Kallmann ..............................95/44 X

FOREIGN PATENTS OR APPLICATIONS 1,087,372  8/1960  Germany

Primary Examiner—Harry N. Haroian
Attorney—Townsend and Townsend

[57] ABSTRACT

An automatic lens focusing method and apparatus is disclosed wherein advantage is taken of the geometrical optics of out-of-focus images by varying the effective aperture of an image forming lens to produce relative motion of the out-of-focus portions of the formed image. A motion detector at the imaging plane generates a signal in response to motion of the out-of-focus portions of the formed image which may then be used for control of the image-forming lens to provide optimum focusing or to provide range finding information.

9 Claims, 8 Drawing Figures

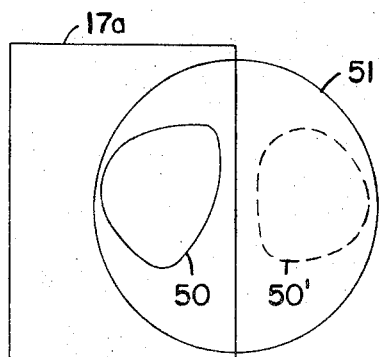
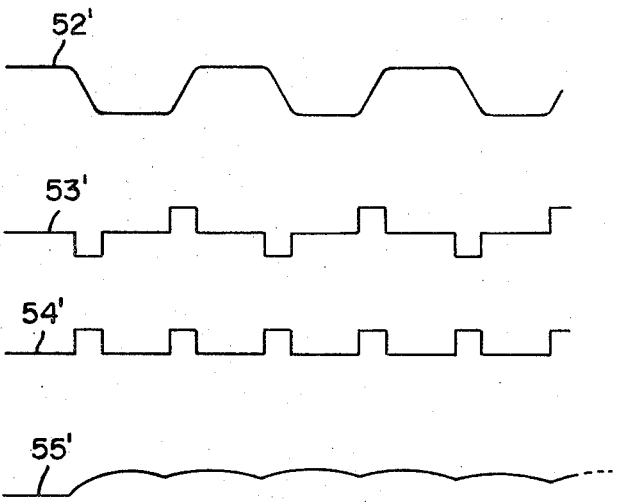
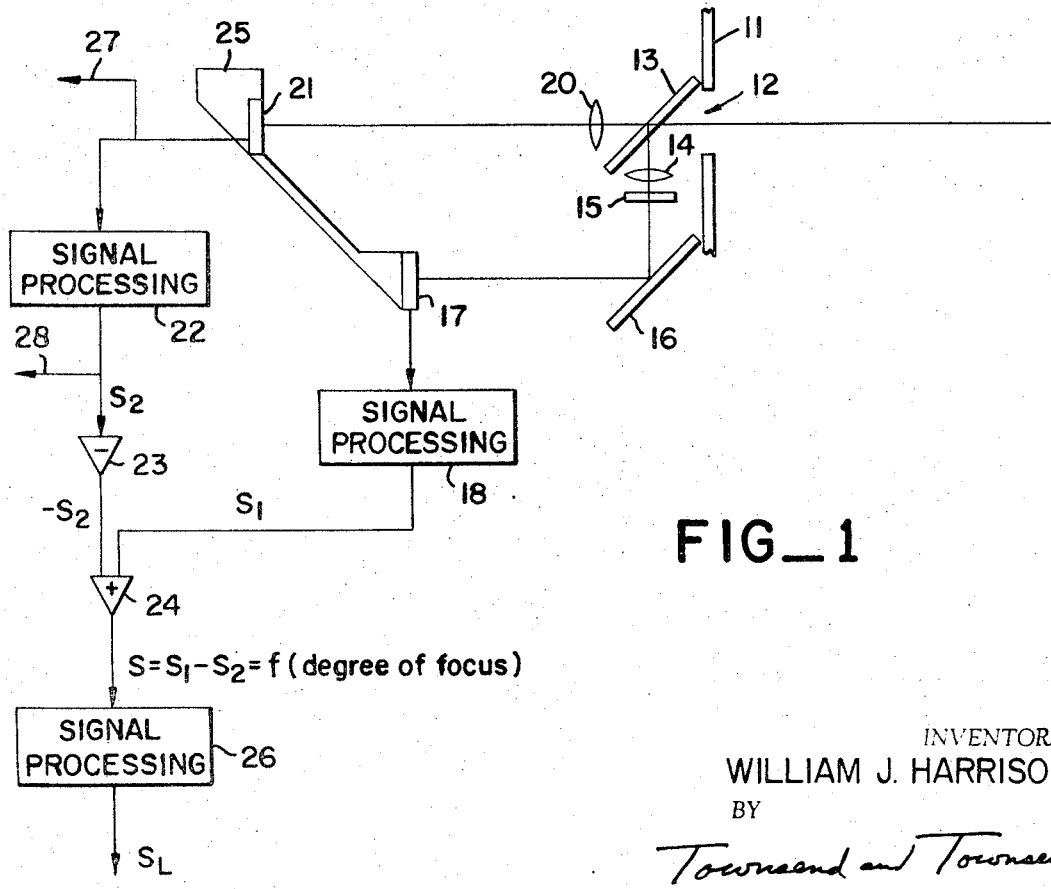
FIG_2
FIG_1
INVENTOR
WILLIAM J. HARRISON

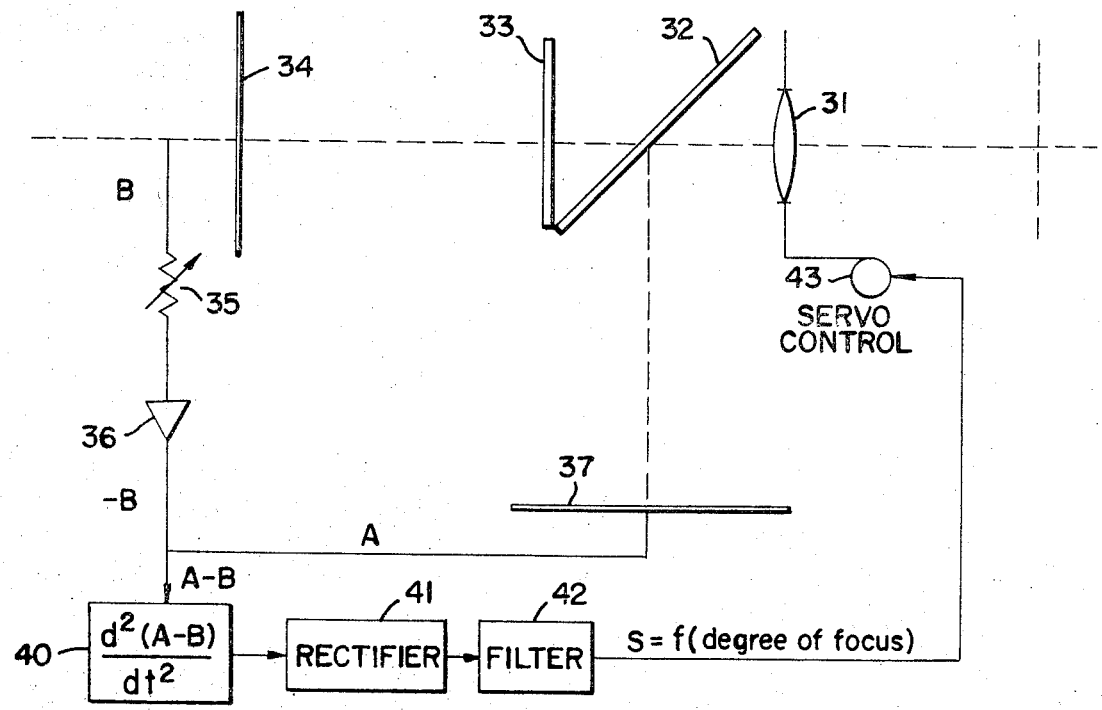
FIG_3
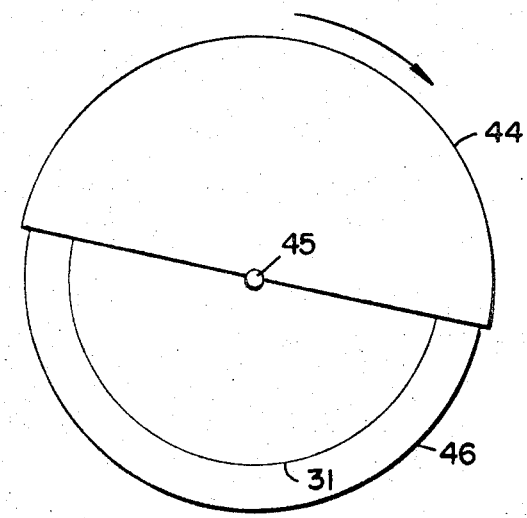
FIG_4

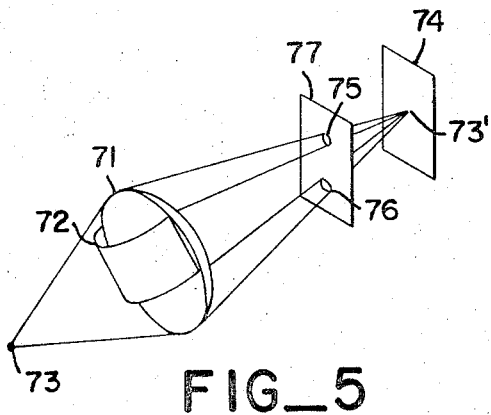
FIG_5
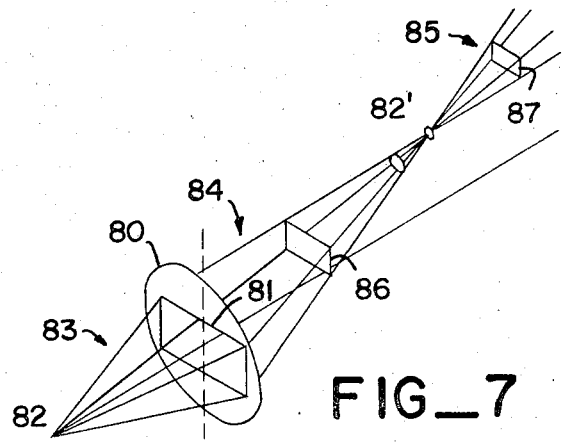
FIG_7
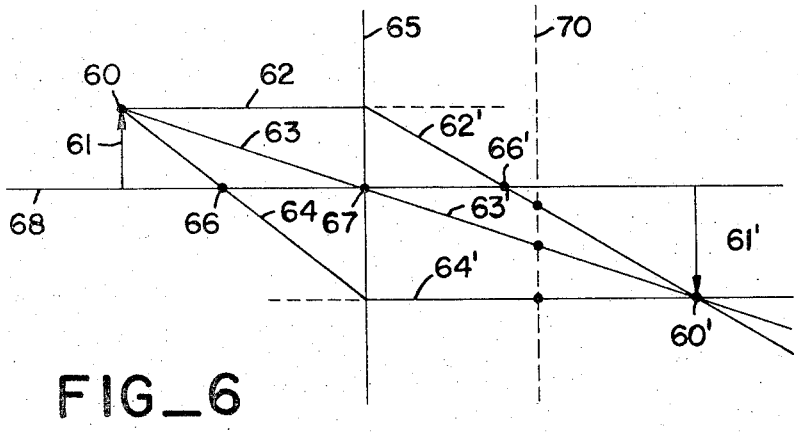
FIG_6
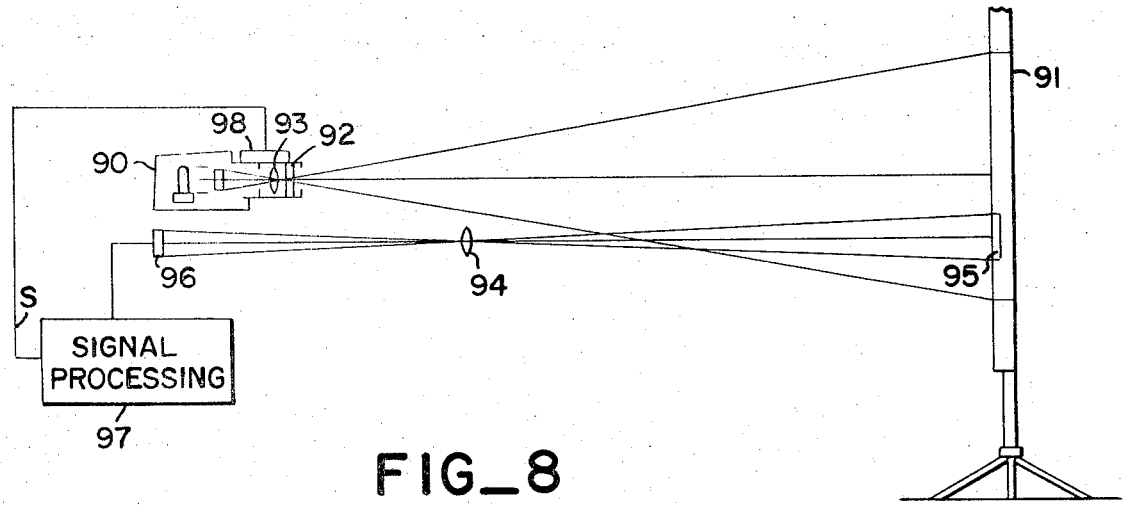
FIG_8

AUTOMATIC LENS FOCUSING METHOD AND APPARATUS

This is a continuation of application Ser. No. 691,405 filed Dec. 18, 1967.

This invention relates to a new and improved automatic lens focusing method and apparatus useful in cameras and slide projectors, and close and long-distance range finders.

It is an object of the present invention to provide a new and improved automatic lens focusing method and apparatus by varying the effective aperture of an image forming lens to thereby produce variation in the properties of the out-of-focus portion of a formed image.

Another object of the invention is to provide a motion detector which generates a signal in response to variation of the out-of-focus portion of an image formed on the motion detector. The generated signal may then be processed to provide a final signal proportional to the degree of focus which may be used to provide range finding information or to control the relative position of the image forming lens for optimum focusing.

In order to accomplish these results, the present invention contemplates the provision of means for varying the effective aperture of an image-forming lens comprising a rotating mask which periodically varies the position of the effective aperture across the face of the lens. The invention also contemplates detecting the motion of out-of-focus portions of a formed image produced by variations in the effective aperture of the image-forming lens by a partially masked photo-detector at the imaging plane to thereby generate a signal which varies in proportion to variations of the out-of-focus portions of the formed image. The signal may then be processed to provide a measure of the degree of focus which may be used for servocontrol of the image-forming lens to provide optimum focusing. The processed signal may also be used for range finding information.

Other objects, features and advantages of the present invention will become apparent in the following specification and accompanying drawings in which:

FIG. 1 is a diagrammatical view from the side of one form of range finding apparatus embodying the present invention;

FIG. 2 is a block diagram of the motion detector and signal generating and processing system and corresponding waveform diagrams for use in the apparatus illustrated in FIG. 1;

FIG. 3 is a diagrammatic view from the side of an automatic focusing device embodying the present invention;

FIG. 4 is a front view of an aperture varying means comprising a rotating semi-circular mask;

FIG. 5 is a perspective view of an optical system demonstrating the Scheiner principle;

FIG. 6 is a simple ray tracing diagram;

FIG. 7 is an optical system illustrating the object and image light cones;

FIG. 8 is a diagrammatic cross-sectional view from the side of another embodiment of the present invention for automatic lens focusing in slide projectors.

In the embodiment of the present invention for range finding illustrated in FIG. 1, there is provided a plate 11 having an opening formed therein defining a viewing port 12 through which light from an object whose image is to be formed and whose range is to be determined is received onto a beamsplitter 13. The reflected portion of the received light is directed to one of two matched lenses 14 whose effective aperture is varied by an aperture varying mask 15. Light focused through lens 14 is directed by full mirror 16 onto a motion detector comprising a partially masked photocell detector 17. The signal generated by photocell detector 17 is process by signal processing circuitry 18 to produce a smooth signal $S_1$ proportional to variations in the out-of-focus portions of the image formed at photocell detector 17 by lens 14 produced by variations in the effective aperture of lens 14 by aperture varying mask 15. The signal also includes components resulting from image motion produced by motion of the object whose image is being formed and motion of the apparatus relative to the object.

The portion of the received light transmitted through beamsplitter 13 is focused by the other matched lens 20 onto a second motion detector comprising a second partially masked photocell detector 21. The signal generated by photocell detector 21 is processed by signal processing circuitry 22 to produce a smooth signal $S_2$ proportional to motion of the image resulting from motion of the image-forming device relative to the object and motion of the object whose image is being formed. Signal $S_2$ is passed through an inverter 23 to provide a signal $-S_2$ equal and opposite in voltage to the voltage of $S_2$ which is then added by signal adder 24 to the signal $S_1$ to provide a signal $S$ equal to the difference between the signals $S_1$ and $S_2$. The signal $S$ is proportional to variations in the out-of-focus portion of the image produced by the aperture varying mask 15 only and thereby proportional to the degree of focus. Photodetectors 17 and 21 positioned at the image plane of matched lenses 14 and 20 respectively are coupled together by a moving mechanical coupling 25 so that motion of the photodetectors 17 and 21 is coordinated. Thus, the image-forming planes at 17 and 21 may be varied to minimize the signal $S$ and thereby provide information for determining the range or the optimum focus of the image and thereby the distance of the object whose image is formed.

A further signal processing circuit 26 may be provided for detecting local dips in the value of $S$ corresponding to local focus planes of the geography in the direction of the object whose range is being sought. The resulting signal $S_L$ may then be interpreted by an operator for a decision on which focus plane to use.

The circuitry shown in FIG. 1 may also be provided with a tap-off point 27 for use as an exposure meter and a tap-off point 28 for shutter speed determination.

The signal processing circuit 18 is shown in more detail in FIG. 2. The mask 15 of FIG. 1, having a predetermined shape, rotates about the optical axis of lens 14 varying the position of the effective aperture of lens 14. Any particular out-of-focus image point 50 precesses around the circle of confusion 51 produced by the unmasked lens which is associated with that image point as shown in FIG. 2. Photocell detector 17 is partially masked with a grid so that as image point 50 rotates about the circle of confusion 51 in the image plane it periodically falls on and off a portion 17a of the photosensitive surface producing a periodic voltage 52. The position of image point 50 when formed off the photosensitive surface 17 is shown at 50'. The periodic voltage 52 with waveform shown at 52' is fed through a differentiating circuit 53 producing a voltage with the waveform shown at 53' proportional to the variation in voltage 52 and therefore the motion of out-of-focus point 50. The derivative signal 53' is rectified by a rectifier 54 producing the signal of waveform 54' and filtered through filter 55 to produce the smooth signal $S_1$ with waveform 55'. The final signal $S_1$ includes components proportional to the motion of out-of-focus portions of the formed image and also motion of the object whose image is formed and motion of the apparatus relative to the object. From signal $S_1$ the signal $S_2$ is subtracted leaving only the component proportional to the degree of focus.

In the embodiment of the present invention for automatic lens focusing illustrated in FIG. 3, there is provided an image forming lens 31 which receives and focuses light from an object whose image is to be formed. Light passing through lens 31 is split by beamsplitter 32, the portion of the light transmitted through beamsplitter 32 passing through an aperture varying means 33 to a first photocell detector 34 positioned generally near the image plane. The photosensitive surface of photocell detector 34 is selectively masked with a grating to thereby function as a motion detector of motion of out-of-focus portions of the formed image produced by variation of the effective aperture of lens 11 produced by aperture varying means 33. The signal generated by photocell detector 34 includes components produced by motion of the object whose image is being formed and motion of the apparatus relative to the object in addition to motion of the out-of-focus portions of the image. The generated signal B generated by photocell detector 34 passes through a rheostat 35 provided for zero adjustment and a signal inverter 36 to provide a signal −B of voltage approximately equal and opposite in sign to that of the signal B.

The portion of the light passing through lens 31 and reflected by beamsplitter 32 forms an image on a second photocell detector 37 constructed similar to photocell detector 34 to thereby act as a motion detector. The signal A generated by photocell detector 37 varies in proportion to motion of the object whose image is to be formed and motion of the image-forming device relative to the object. The signals A and −B are added to produce a single signal A −B which varies in proportion to motion of the out-of-focus portions of the image formed by lens 31 and aperture varying means 33 which periodically varies the effective aperture of lens 31. The resulting signal A −B is differentiated by a differentiating circuit 40 to produce a signal proportional to the variation of the voltage of signal A −B which is rectified by rectifier 41 and filtered by filter 42 to produce the smooth signal S proportional to the degree of focus of the image formed by lens 31. The signal S may then be used to drive a servo-control device 43 which varies the positioning of lens 31 to obtain optimum focusing.

As shown in FIG. 4, the aperture varying means 33 comprises a semicircular mask 44 pivotally mounted along the optical axis 45 of lens 31. The semicircular mask 44 is adapted to rotate about the optical axis 45 along a provided track 46 to thereby periodically vary the position of the effective aperture of lens 31 without varying its size. Thus, as a result of rotation of the semicircular mask, the properties of out-of-focus portions of the image formed by lens 31 are periodically varied while the porperties of the in-focus portions of the image remain constant. Rotation of the mask periodically interrupts the light passing through the lens to vary the position but not the overall intensity of the transmitted light. Because the position and not the size of the effective aperture is periodically varied, the intensity of the in-focus portions of the image remains constant.

In order to more particularly understand the principle of operation of the present invention, reference is made to FIGS. 5 − 7. FIG. 6 shows a standard two-dimensional ray tracing diagram in which object point 60 in object plane 61 forms image point 60' in the image plane 61', as shown by three constructed object light ray traces 62, 63 and 64 passing through the nodal plane 65 of a thin lens and converging to form the image light ray traces 62', 63' and 64'. The three ray traces chosen are the easiest to construct, passing through the radii of curvature 66 and 66' and center 67 of the lens along the optical axis 68. It is seen that the three traces converge to a point or minimum circle of confusion 60' in the in-focus image plane 61'. If a screen is interposed in the plane 70 so that an out-of-focus image of object point 60 is formed, the ray traces are no longer coincident and an enlarged circle of confusion results. Elimination of either of the image light ray traces 62' or 64' results in a change in the position and shape of the out-of-focus image at plane 70 while varying only the intensity of image point 60' in the in-focus image plane 61'. In reality, an infinite number of ray traces comprise the image point. Thus, if a semicircular aperture mask were mounted in the nodal plane 65 of the image-forming lens and rotated about the optical axis 68, as each ray trace was blocked out another would take its place. Thus, the intensity of the in-focus image point 60' would remain constant as would its other properties. However, the out-of-focus image in plane 70 would periodically change its position precessing around the circle of confusion of the out-of-focus image formed with the semicircular mask removed.

The diameter of the circle of confusion of the image formed by object point 60 is at a minimum at the in-focus image plane 61' where the image 60' approaches a point. As the screen on which the image is formed is moved further away from the in-focus image plane in either direction, the circle of confusion of the out-of-focus image increases and the diameter of the circle confusion provides a measure of the degree of focus of the formed image. The rotating semicircular mask positioned adjacent the nodal plane 65 of the image-forming lens periodically varies the position of the effective aperture of the lens resulting in precession of an out-of-focus image. The diameter of the circle of precession of an out-of-focus image is equal to the diameter of the circle of confusion at that point and therefore the degree of motion of the out-of-focus portion of the image is proportional to and provides a measure of the degree of focus. The present invention takes advantage of this result by providing a motion detector which generates a signal proportional to the degree of motion of the out-of-focus image, the generated signal thereby providing a measure of the degree of focus, and also providing the means for controlling a feedback or servo-mechanism device for adjusting either the position of the image-forming lens or the screen to provide optimum focusing. At the same time, minimizing the generated signal by repositioning either the lens or image screen provides information as to the range of the object whose image is to be formed.

As shown in FIG. 5, a lens 71 is provided with the central portion masked by an opaque band 72 to demonstrate further distortion of the out-of-focus image. Object point 73 which forms an image point 73' in the in-focus image plane 74 produces split images 75 and 76 in the out-of-focus plane which intersects the converging image rays. This phenomenon is known as the Scheiner principle in physiological optics. It is thus apparent that masking of the image-forming lens may be accomplished in any of a number of ways to produce motion of the out-of-focus portion of an image.

In any image-forming system there are many ray paths connecting the object and image points, one through every point in the nodal plane of the image-forming lens aperture. In the common case of a round aperture area, if every one of the infinite number of traces could be drawn in a three-dimensional diagram they would together appear in the form of three cones. The first would be tipped at the object point and based in the nodal plane of the image-forming lens around the aperture. The second would have a base in the nodal plane common with the first cone and extend in to the image space, tipping at the image point. The third would simply be a continuation of the second cone in image space beyond the image point. A fourth cone could appear in object space extending beyond the object point also if that object point itself were a virtual image. If the object point is not on the optical axis of the image-forming lens, the cones are skewed or flattened having elliptical cross sections, and if the aperture geometry of the image-forming lens is not circular the perimeter of cross sections of the resulting cones will conform to the perimeter of the aperture geometry. But, in each case, the cone will have a tip at either the object or image point and a base in the nodal plane. For purposes of this discussion, the term "cone" is used to refer to any of the above-described light configurations.

Thus, as illustrated in FIG. 7, the nodal plane 80 of an image-forming lens is shown in which the aperture 81 is rectangular in shape. An object point 82 formed by a multitude of ray traces forms an image point or circle of minimum confusion 82' in the in-focus image plane. The first cone 83 is tipped at the object point 82 and based in the nodal plane 80 which has a rectangular base. The second light cone 84, tipped at image point 82', has the common rectangular base at the nodal plane 80. The third cone 85 is tipped at the image point 82' and extends beyond into the image space. If a screen is interposed in either the second or third light cones 84 and 85, thereby intercepting the image ray traces, an out-of-focus image 86 is formed of the object point 82. Because the effective aperture 81 of the image-forming lens whose nodal plane is at 80 is rectangular in cross section, the out-of-focus image conforms to the shape of the aperture. On the other hand, the in-focus image 82' of object point 82 is independent in shape from the effective geometry of aperture 81 and is dependent only upon the shape of the object 82 of which it is the image.

It is thus seen that any alteration in the aperture geometry of the nodal plane aperture causes related alteration in the positioning, degree of focus, size, and shape of those parts of the image that are out of focus when viewed on a screen intercepting the second or third light cone, but no apparent changes in position, size or shape is produced in those parts of the image that are in focus. In other words, the light cone defined as having its base coincident with the effective nodal plane aperture area at all times and its tip at an in-focus image point with sides of straight lines connecting the perimeter of the base to the tip and beyond will in its cross section approximate the shape of the image that the object point will assume on a focusing screen cutting that cross section. If an intersection 87 of the third light cone 85 is chosen, again the shape of the out-of-focus image will conform to the perimeter of the effective nodal plane aperture area. This effect can be seen as the result of the fact that every point in the nodal plane aperture area contributes equally to any one in-focus image point, but any particular point in the nodal plane aperture area does not necessarily contribute equally to every image point.

The principles discussed above are implemented by the present invention by periodically varying the effective aperture area of an image-forming lens by periodically interrupting the light passing through the lens and sampling the image to determine the variations produced in out-of-focus portions of the formed image. By using the rotating, opaque semicircular mask, illustrated in FIG. 4, out-of-focus portions of the sampled image will precess around the area represented by the circle of confusion of the image produced by the unmasked aperture area. A signal may then be generated in proportion to variation of the out-of-focus portions of the image thereby providing a measure of the degree of focus and also providing means for driving a servo-control for positioning the lens for maximum or optimum focus. Alternatively, minimizing the generated signal can provide distance and range information.

The motion detector can be made from a photocell detector by laying parallel strips 48 of opaque masking across the photosensitive surface 49 forming a grid and thus effectively creating a number of small cells in parallel with one another as shown in FIG. 9. The precessing circles of out-of-focus portions of the image rotating within respective circles of confusion and produced by the rotating semicircular mask will therefore fall on and off photosensitive portions of the surface of the photocell detector producing periodically changing voltages. The first derivative of this signal, rectified and filtered, produces a smoothed signal proportional to variation of the out-of-focus portions of the image. Because any object or natural scene does not produce a fully randomed distribution of light, the signals generated by the out-of-focus portions of the formed image do not cancel out and instead produce a variation in the photocell detector output proportional to the degree of focus of the image. Filtering may be necessary to eliminate electronic noise generated by the detection circuit.

The greater the lack of focus, the larger is the diameter of the circle of confusion and the path that any given out-of-focus image point travels during rotation of the semicircular mask which periodically varies the effective aperture of the image-forming lens. If the motion detector is comprised of a photocell detector having a photosensitive surface to which is adhered a plurality of parallel opaque strips, and on which the out-of-focus image points precess, the greater the diameter of the circle of confusion and the greater the path followed by the out-of-focus image portions, the greater the frequency of the periodic voltage output of the photocell detector and the frequency of the first derivative spikes and therefore the greater the final signal as alternating strips of photosensitive surface and opaque surface are crossed by the out-of-focus portions of the image.

Instead of varying the position of the effective aperture area across the face of the image-forming lens, the size of the effective aperture area may also be varied as occurs in "stopping down" the diaphragm and aperture of a camera to a higher $f$ number. In-focus images will not change, but the out-of-focus images will tend to sharpen, or as commonly stated, the "depth of focus" increases. "Stopping down" the diaphragm or aperture of a camera lens is thus seen to be a special case of the optical geometry of out-of-focus images herein discussed. This technique has the disadvantage, however, of varying the area of the effective aperture and therefore the intensity of the in-focus portions of the image.

Another method of varying the position of the effective aperture would be to alternately mask transmitting portions of the lens. Thus, two transmitting apertures could be provided on either side of the optical axis of a lens by an opaque mask having two transparent portions therein positioned adjacent the lens surface. The two transparent portions could then be alternately masked by a second opaque mask.

Since the motion detector will also detect motion of the object whose image is being formed and motion of the image-forming device relative to the object, the components of the photocell detector output attributable to these sources must be eliminated so that only components of the photocell detector output attributable to the degree of focus result. This can be accomplished by providing a second optical channel to which a portion of the received light is directed by a half silvered mirror or beamsplitter as in the forms of the invention illustrated in FIGS. 1 and 3. The second channel does not include an aperture varying means and therefore detects motion of the formed image produced by motion of the object or the image-forming device relative to the object only. The signal generated by motion of the image attributable to motion of the object or image-forming device can be subtracted from the signal produced by motion of the image in the original channel produced not only by motion of the object and image-forming device but also by motion of the out-of-focus portion of the image produced by an aperture varying means which varies the effective aperture of the image-forming lens. The resulting signal is then attributable only to motion of the out-of-focus portion of the image and therefore provides a measure of the degree of focus.

Yet another embodiment of the present invention illustrated in FIG. 8 is an automatic slide projector focuser. In this embodiment of the invention there is provided generally a slide projector 90 which projects an image on screen 91. An aperture varying means 92 such as a rotating semicircular mask provided in the slide projector causes an out-of-focus image on the screen to precess through a circle whose diameter is proportional to the degree of focus. A second optical channel can be established parallel to the optical axis of the projection lens 93 comprising a lens 94 which forms an image of some central subarea 95 of screen 91 on a motion detector 96 such as a partially masked photocell detector. The output of photocell detector 96 is processed by signal processing circuit 97 which takes the derivative of the signal, rectifies and filters it to produce a smoothed signal S proportional to the degree of focus of the formed image on screen 91. The signal S can be used to drive a feedback or servo-control mechanism 98 to adjust the lens for optimum focus.

The present invention is useful for application in many devices including close-distance and long-distance range finders and automatic focusing devices for hand-held cameras and slide projectors. The motion detector alone is useful as a device for plant protection and monitoring moving machinery such as spinning gears or dial pointers and as a device for determining the required shutter speed on a camera shutter.

While only certain embodiments of the present invention have been shown and described, other adaptations and modifications of the present invention would be obvious to a person of ordinary skill in the art without departing from the true spirit and scope of the following claims.

I claim:

1. Apparatus for determining degree of focus comprising: a beam splitter for receiving incident light from an object whose image is to be formed and providing first and second beams; first image-forming lens interposed in the path of the first beam; first image motion detector spaced from the first lens in a position to receive an image formed by the first lens, said motion detector being designed to generate a signal in response to the quantum of image motion of the image formed on said motion detector; masking means mounted adjacent the first lens in a position to interrupt a portion of the light passing through the first lens onto the first motion detector; means for moving said masking means to produce motion of the out-of-focus portion of the image formed on the first motion detector whereby a signal $S_1$ is generated in response to motion of the out-of-focus portion of the formed image on the first motion detector, motion of the formed image produced by motion of the object whose image is being formed, and motion of the formed image produced by motion of the apparatus relative to the object; second image-forming lens with characteristics matching the first image-forming lens, interposed in the path of the second beam; second motion detector spaced from the second image-forming lens in a position to receive an image formed by said second lens, said second motion detector also being designed to generate a signal in response to motion of the image formed on the second motion detector, whereby a second signal $S_2$ is generated in response to motion of the object whose image is to be formed and motion of the apparatus relative to the object; a signal inverter to which one of the generated signals is fed to thereby provide a signal substantially equal in value and opposite in sign to the signal fed into the signal inverter; and a signal adder to which the output of the signal inverter and the other signal are fed to thereby provide a signal in response to the degree of focus of the formed images.

2. Apparatus for determining degree of focus as set forth in claim 1 wherein said masking means and means for moving said masking means vary the position of the effective aperture of the first lens while maintaining a substantially constant effective aperture area.

3. Apparatus for determining degree of focus as set forth in claim 2 further provided that the masking means and means for moving the masking means comprise an opaque mask of predetermined shape pivotally mounted for rotation about the optical axis of the first lens and means for rotating said opaque mask.

4. Apparatus for determining degree of focus as set forth in claim 1 wherein said first and second motion detectors each comprise a photodetector having a photosensitive surface over which is formed a grid of opaque portions.

5. Apparatus for determining degree of focus as set forth in claim 4 wherein said grid comprises a plurality of parallel strips of opaque material.

6. Apparatus for determining degree of focus as set forth in claim 4 wherein there is further provided at the output of each photodetector, differentiating circuit means to which the output of the photodetector is fed to thereby provide a signal in response to variations in the output of the photodetector.

7. Apparatus for determining degree of focus as set forth in claim 6 wherein there is further provided at the output of each differentiating circuit, rectifier circuit means and filter means to which the output of the differentiating circuit means is fed to provide a smoothed signal.

8. Automatic lens focusing apparatus comprising image forming lens means; a beam splitter spaced from said lens means providing first and second beams from light passing through said lens means; first image motion detector interposed in the path of the first beam and spaced from said beam splitter in a position to receive an image formed by said lens means, said motion detector being designed to generate signal in response to motion of the image formed thereon; masking means interposed in the path of said first beam mounted adjacent said beam splitter in position to interrupt a portion of the light comprising the first beam of light passing from said beam splitter onto said first motion detector; means for moving said masking means to cause motion of the out-of-focus portion of the image formed on said motion detector whereby a signal is generated in response to motion of the out-of-focus portion of the formed image, motion of the image produced by the motion of the object whose image is being formed and motion of the image produced by motion of the apparatus relative to the object; second motion detector interposed in the path of the second beam of light and spaced from said beam splitter in a position to receive an image formed by said lens means, said second motion detector being designed to generate signal in response to motion of the image formed thereon whereby a second signal is generated in response to motion of the image produced by motion of the object whose image is being formed, and motion of the image produced by motion of the apparatus relative to the object; a signal inverter to which one of the two generated signals is fed; and a signal adder to which the output of the signal inverter and the other signal are fed to thereby produce a signal in response to the degree of focus of the formed images.

9. Automatic lens-focusing apparatus as set forth in claim 8 wherein each of said motion detectors comprises a photodetector having a photosensitive surface with a grid of opaque material formed thereon and wherein there is also provided differentiating circuit means to which the output of said photodetector is fed.

* * * * *